(12) United States Patent
Calhoun et al.

(10) Patent No.: US 7,619,033 B2
(45) Date of Patent: **\*Nov. 17, 2009**

(54) PROCESS FOR PREPARING AN AQUEOUS DISPERSION OF A QUATERNARY AMMONIUM SALT CONTAINING VINYL COPOLYMER

(75) Inventors: Glenn C. Calhoun, Waukesha, WI (US); Rodney M. Weston, St. Francis, WI (US)

(73) Assignee: Bostik, Inc., Wauwatosa, WI (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/229,413

(22) Filed: Sep. 16, 2005

(65) Prior Publication Data

US 2006/0030661 A1    Feb. 9, 2006

Related U.S. Application Data

(63) Continuation-in-part of application No. 10/803,306, filed on Mar. 18, 2004.

(51) Int. Cl.
*C09D 5/02* (2006.01)
(52) U.S. Cl. .......... 524/556; 442/59; 442/327; 442/409; 526/318.44; 526/319; 526/320; 526/348
(58) Field of Classification Search .......... 524/556; 442/59, 327, 409; 526/318.44, 319, 320, 526/348
See application file for complete search history.

(56) References Cited

U.S. PATENT DOCUMENTS

| 5,312,883 | A | 5/1994 | Komatsu et al. |
| 5,317,063 | A | 5/1994 | Komatsu et al. |
| 5,384,189 | A | 1/1995 | Kuroda et al. |
| 6,423,804 | B1 | 7/2002 | Chang et al. |
| 6,653,406 | B1 | 11/2003 | Soerens et al. |
| 2003/0027470 | A1 | 2/2003 | Chang et al. |
| 2003/0032352 | A1* | 2/2003 | Chang et al. ............ 442/102 |

FOREIGN PATENT DOCUMENTS

| WO | WO 02077040 | 10/2002 |
| WO | WO 2004026354 | 4/2004 |

* cited by examiner

*Primary Examiner*—Robert D. Harlan
(74) *Attorney, Agent, or Firm*—Andrus, Sceales, Starke & Sawall, LLP

(57) ABSTRACT

A method of making an ion triggerable cationic polymer by solution copolymerizing one or more vinyl-functional cationic monomers, one or more water insoluble or hydrophobic vinyl monomers with alkyl side chains up to 4 carbons long, and, optionally, a minor amount of one or more vinyl monomers with linear or branched alkyl groups longer than 4 carbons, alkyl hydroxy, polyoxyalkylene, or other functional groups. The solution polymerization is accomplished by free radical polymerization in a mixture of an organic solvent such as acetone and water. After polymerization is complete, the organic solvent is preferably removed by a continuous process. The continuous process is preferably performed using a plate evaporator system.

27 Claims, No Drawings

PROCESS FOR PREPARING AN AQUEOUS DISPERSION OF A QUATERNARY AMMONIUM SALT CONTAINING VINYL COPOLYMER

CROSS REFERENCE TO RELATED APPLICATION(S)

This application is a Continuation-In-Part of U.S. patent application Ser. No. 10/803,306 filed Mar. 18, 2004.

BACKGROUND OF THE INVENTION

The present invention is directed toward ion-sensitive or triggerable, water-dispersible or water-soluble cationic polymers, and more particularly to a method of making such cationic polymers.

It has been proposed that ion-triggerable cationic polymers be used as a binder for fibrous webs in the manufacture of disposable products such as diapers, wet wipes, incontinent garments and feminine care products. It has been discovered that such ion-triggerable cationic polymers have adequate in-use strength to bind different fibrous layers of disposable products together, but will readily dissolve or disintegrate in water providing the ability to dispose of the product by flushing it down a toilet, if desired. The polymer has a "trigger property" meaning that the polymer is insoluble in monovalent and/or divalent salt solutions at concentrations above about 0.3% by weight, but is soluble when the solution is diluted with water, such as when the product is discarded into water contained in a toilet. This allows the fibrous web to break apart and disperse enabling the product to be flushable.

Ion-sensitive polymers comprised of acrylic acid and alkyl or aryl acrylates are disclosed in U.S. Pat. No. 5,312,883, U.S. Pat. No. 5,317,063 and U.S. Pat. No. 5,384,189. The ion-triggerable polymers disclosed in these patents are acrylic acid-based terpolymers, which comprise partially neutralized acrylic acid, butyl acrylate and 2-ethylhexyl acrylate. The disclosed terpolymers, however, are limited in their application as a flushable binder material to geographical areas having soft water rather than hard water because these terpolymers fail to adequately disperse in water containing more than about 15 parts per million $Ca^{2+}$ and/or $Mg^{2+}$ ions.

In U.S. Pat. No. 6,423,804 there is disclosed a modification of the acrylic acid terpolymers of the above-referenced '883, '063 and '189 patents. More specifically, the '804 patent discloses a sulfonate anion modified acrylic acid terpolymer which has improved dispersability in relatively hard water, as compared to the unmodified terpolymers of the above-referenced patents. The sulfonate modified terpolymer of the '804 patent is prepared from four monomers, namely, acrylic acid, a sulfonate containing monomer such as 2-acrylamido-2-methyl-1-propanesulfonic acid (AMPS), or the sodium salt thereof (NaAMPS), butyl acrylate and 2-ethylhexyl acrylate. These four monomers are dissolved in an acetone/water mixture. The monomer solution is deoxygenated, and the monomer solution along with an initiator dissolved in acetone are then added together and polymerized. Distillation removes the excess acetone and deionized water is then added to reduce the viscosity of the polymer solution.

Although numerous solution polymerization techniques are known, there remains a need for providing a method of preparing ion-triggerable cationic polymers because the anionic acrylic acid based ion-sensitive polymers and the sulfonate anion modified acrylic acid terpolymers of the above-referenced patents, when used as binders for personal care products, such as wet wipes, typically have reduced initial sheet wettability, increased dry sheet stiffness, increased sheet stickiness, reduced binder sprayability and relatively high product cost. Preferably, the process should desirably result in high yield of the polymer, be relatively economical, and be scaleable up to a commercial basis. In addition, the process must provide a cationic polymer having relatively high molecular weight because high molecular weight provides the strength necessary for use as a fibrous web binder. Finally, the process should be environmentally friendly, i.e. it should preferably not use any hazardous air pollutant (HAP) and/or any volatile organic compound (VOC) which might contribute to air pollution.

SUMMARY OF THE INVENTION

A method of making an ion triggerable cationic polymer comprises solution copolymerizing one or more vinyl-functional cationic monomers, one or more water insoluble or hydrophobic vinyl monomers with alkyl side chains up to 4 carbons long, and, optionally, a minor amount of one or more vinyl monomers with linear or branched alkyl groups longer than 4 carbons, alkyl hydroxy, polyoxyalkylene, or other functional groups. The solution polymerization is accomplished by free radical polymerization in a mixture of an organic solvent and water. After the copolymerization is complete, the organic solvent is removed either via a batch or continuous process, but preferably by a continuous plate evaporator system, and replaced with water to give an aqueous dispersion of the ion-triggerable cationic polymer.

The preferred organic solvent is one having a boiling point below 100° C. at atmospheric pressure. Examples of solvents such as these are acetone, methylethylketone, tetrahydrofuran, methylacetate, acetonitrile, methanol, ethanol, isopropanol, 1-propanol, t-butanol and mixtures thereof. It is preferred to use water miscible solvents, particularly acetone. In addition, up to about 50% by weight, preferably up to about 35% by weight and most preferably up to about 25% by weight, based on the total weight of the solvent may be water.

More specifically, the steps of the process include preparing a mixed solvent solution of water and solvent (preferably acetone), and heating the solvent solution. Preferably, the solvent solution is heated to reflux. Thereafter, the process steps include mixing with the solvent solution one or more vinyl-functional cationic monomers, one or more hydrophobic vinyl monomers having alkyl side chains of 1-4 carbon atoms, optionally about 0% to 30 mole % of one or more other vinyl monomer with linear or branched alkyl groups longer than 4 carbons, alkyl hydroxy, polyoxyalkylene, or other functional group, and a free radical initiator to form a reaction mixture. The reaction mixture is heated for a sufficient amount of time and at a sufficient temperature to polymerize the monomers and produce the ion-triggerable cationic polymer. After the polymerization, the solvent (preferably acetone) is removed and water is added to provide an aqueous dispersion of the ion-triggerable cationic polymer, substantially free of all of the solvent. The removal of the solvent and the addition of water steps may be performed in any sequence, including simultaneously. The organic solvent may be removed by either a batch or continuous process, but the preferred method is via a continuous evaporator technology such as a falling film, rising film or plate evaporator system. The preferred vinyl-functional cationic monomer is a quaternary ammonium salt containing vinyl monomer such as [2-(acryloxy)ethyl]trimethyl ammonium chloride, and the preferred hydrophobic vinyl monomer is methyl acrylate.

The process preferably includes recycling the organic solvent such as acetone to be re-used as the solvent ingredient of the initial solvent and water mixed solvent solution. Recycling the solvent such as acetone has the advantage of making the present process commercially economical and feasible. Additionally, a solvent such as acetone is not listed as a volatile organic compound (VOC) and/or as a hazardous air pollutant (HAP) which is also advantageous for commercialization purposes. Also, acetone is preferred over some other solvents because it advantageously achieves an end product of relatively high molecular weight as opposed to other lower alcohols or lower ketones such as for example methanol or ethanol that might be used as a solvent for the vinyl monomer. Finally, acetone is further preferred because it is easier to remove and recover from the reaction mixture in high purity than other solvents so that it can be recycled for use in subsequent polymerization reactions.

DETAILED DESCRIPTION OF THE INVENTION

The polymers synthesized in accordance with the present invention are useful as binders and structural components for air-laid and wet-laid nonwoven fabrics for applications, such as body-side liners, fluid distribution materials, fluid in-take materials (surge) or cover stock in various personal care products. The polymer formulations of the present invention are particularly useful as a binder material for flushable personal care products, particularly wet wipes for personal use, such as cleaning or treating skin, make-up removal, nail polish removal, medical care, and also wipes for use in hard surface cleaning, automotive care, including wipes comprising cleaning agents, disinfectants, and the like. The flushable products maintain integrity or wet strength during storage and use, and break apart or disperse after disposal in a toilet when the salt or ion concentration falls below a critical level. Suitable substrates for treatment include tissue, such as creped or uncreped tissue, co-form products, hydroentangled webs, air-laid mats, fluff pulp, nonwoven webs, and composites thereof.

The present invention is directed to a method of making ion-sensitive or triggerable cationic polymers that are water-dispersible or water-soluble for use as the binder for the nonwoven fabrics referred to above. The binder provides strength in the dry state, but more importantly, helps maintain a desired level of strength in the wet state by ion-triggerability. A controlled concentration of salt in the wetting solution insolubilizes the binder and allows it to function as an adhesive for the web. When the product, preferably a wet wipe is discarded into the wastewater stream, the salt concentration is diluted, the binder becomes soluble, and the strength drops below a critical level. The ion-triggerable polymers thus have a "trigger property," such that the polymers are insoluble in a wetting composition comprising an insolubilizing agent of a particular type and concentration, such as monovalent and/or divalent salt solutions at concentrations above about 0.3% by weight, but are soluble when diluted with water, including hard water with up to 200 ppm (parts per million) calcium and magnesium ions. This allows the web to break apart into small pieces and, ultimately, disperse.

The ion-triggerable cationic polymers are the polymerization product of one or more vinyl-functional cationic monomers, and one or more hydrophobic vinyl monomers with alkyl side chain sizes of up to 4 carbons long. In a preferred embodiment the ion-triggerable cationic polymers are the polymerization product of a vinyl-functional cationic monomer, and one or more hydrophobic vinyl monomers with alkyl side chain sizes of up to 4 carbons long incorporated in a random manner. Additionally, a minor amount, i.e. about 0 to 30 mole %, of one or more other vinyl monomers with linear or branched alkyl groups longer than 4 carbons, alkyl hydroxy, polyoxyalkylene, or other functional groups may be employed. The ion-triggerable cationic polymers function as adhesives for tissue, airlaid pulp, and other nonwoven webs and provide sufficient in-use strength (typically >300 g/in.) in salt solutions, especially sodium chloride. The nonwoven webs are also dispersible in tap water (including hard water up to 200 ppm as metal ion), typically losing most of their wet strength (<30-75 g/in.) in 24 hours, or less.

The generic structure for the ion-triggerable cationic polymers polymerized in accordance with the method of the present invention is shown below:

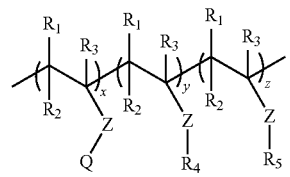

wherein x=1 to about 15 mole percent; y=about 60 to about 99 mole percent; and z=0 to about 30 mole percent; Q is selected from $C_1$-$C_4$ alkyl ammonium, quaternary $C_1$-$C_4$ alkyl ammonium and benzyl ammonium; Z is selected from —O—, —COO—, —OOC—, —COHN—, and —NHCO—; $R_1$, $R_2$, $R_3$ are independently selected from hydrogen and methyl; $R_4$ is selected from a $C_1$-$C_4$ alkyl, i.e. methyl, ethyl, propyl and butyl; and $R_5$ is selected from hydrogen, methyl, ethyl, butyl, ethylhexyl, decyl, dodecyl, hydroxyethyl, hydroxypropyl, polyoxyethylene, and polyoxypropylene. Vinyl-functional cationic monomers useful in the method of the present invention desirably include, but are not limited to, [2-(acryloxy)ethyl]trimethyl ammonium chloride (ADAMQUAT); [2-(methacryloxy)ethyl]trimethyl ammonium chloride (MADQUAT); (3-acrylamidopropyl) trimethyl ammonium chloride; N,N-diallyldimethyl ammonium chloride; [2-(acryloxy)ethyl]dimethylbenzyl ammonium chloride; (2-(methacryloxy)ethyl]dimethylbenzyl ammonium chloride; [2-(acryloxy)ethyl]dimethyl ammonium chloride; [2-(methacryloxy)ethyl]dimethyl ammonium chloride. Precursor monomers, such as vinylpyridine, dimethylaminoethyl acrylate, and dimethylaminoethyl methacrylate, which can be polymerized and quaternized through post-polymerization reactions are also possible. Monomers or quaternization reagents which provide different counter-ions, such as bromide, iodide, or methyl sulfate are also useful. Other vinyl-functional cationic monomers which may be copolymerized with a hydrophobic vinyl monomer are also useful in the present invention.

Desirable hydrophobic monomers for use in the ion-sensitive cationic polymers of the present invention include, but are not limited to, branched or linear $C_1$-$C_{1-8}$ alkyl vinyl monomers, preferably $C_1$-$C_4$ alkyl vinyl ethers, vinyl esters, acrylamides, acrylates, methacrylates, and other monomers that can be copolymerized with the cationic monomer. As used herein the monomer methyl acrylate is considered to be a hydrophobic monomer. Methyl acrylate has a solubility of 6 g/100 ml in water at 20° C.

In a preferred embodiment, the binder is the polymerization product of a cationic acrylate or methacrylate and one or more alkyl acrylates or methacrylates having the generic structure:

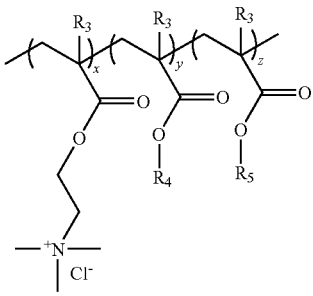

wherein x=1 to about 15 mole percent; y=about 60 to about 99 mole percent; and z=0 to about 30 mole percent; $R_4$ is selected from a $C_1$-$C_4$ alkyl, i.e. methyl, ethyl, propyl and butyl; $R_5$ is selected from ethylhexyl, decyl, dodecyl, hydroxyethyl, hydroxypropyl, polyoxyethylene, and polyoxypropylene.

In an especially preferred embodiment, the ion-triggerable polymer has the structure:

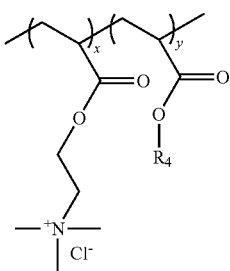

wherein x=1 to about 15 mole percent; y=about 85 to about 99 mole percent and $R_4$ is $C_1$-$C_4$ alkyl. In a most desirable embodiment, when $R_4$ is methyl, x=3 to about 6 mole percent; y=about 94 to about 97 mole percent. The ion-triggerable cationic polymers may have an average molecular weight that varies depending on the ultimate use of the polymer. The ion-triggerable cationic polymers have a weight average molecular weight ranging from about 10,000 to about 5,000,000 daltons. More specifically, the ion-triggerable cationic polymers have a weight average molecular weight ranging from about 25,000 to about 2,000,000 daltons, or, more specifically still, from about 120,000 to about 1,000,000 daltons.

The ion-triggerable cationic polymers may be prepared according to a variety of polymerization methods, desirably a solution polymerization method. The solution polymerization is accomplished by free radical polymerization in a mixture of an organic solvent and water. After the copolymerization is complete, the organic solvent is removed either via a batch or continuous process, but preferably by a continuous plate evaporator system, and replaced with water to give an aqueous dispersion of the ion-triggerable cationic polymer.

The preferred organic solvent is one having a boiling point below 100° C. at atmospheric pressure. Examples of solvents such as these are acetone, methylethylketone, tetrahydrofuran, methylacetate, acetonitrile, methanol, ethanol, isopropanol, 1-propanol, t-butanol and mixtures thereof. It is preferred to use water miscible solvents, particularly acetone. In addition, up to about 50% by weight, preferably up to about 35% by weight and most preferably up to about 25% by weight, based on the total weight of the solvent may be water.

More specifically, the steps of the process include preparing a mixed solvent solution of water and solvent (preferably acetone), and heating the solvent solution. Preferably, the solvent solution is heated to reflux. Thereafter, the process steps include mixing with the solvent solution one or more vinyl-functional cationic monomers, one or more hydrophobic vinyl monomers having alkyl side chains of 1-4 carbon atoms, optionally about 0% to 30 mole % of one or more other vinyl monomer with linear or branched alkyl groups longer than 4 carbons, alkyl hydroxy, polyoxyalkylene, or other functional group, and a free radical initiator to form a reaction mixture. The reaction mixture is heated for a sufficient amount of time and at a sufficient temperature to polymerize the monomers and produce the ion-triggerable cationic polymer. After the polymerization, the solvent (preferably acetone) is removed and water is added to provide an aqueous dispersion of the ion-triggerable cationic polymer, substantially free of all of the solvent. The removal of the solvent and the addition of water steps may be performed in any sequence, including simultaneously. The organic solvent may be removed by either a batch or continuous process, but the preferred method is via a continuous evaporator technology such as a falling film, rising film or plate evaporator system. The preferred vinyl-functional cationic monomer is a quaternary ammonium salt containing vinyl monomer such as [2-(acryloxy)ethyl]trimethyl ammonium chloride, and the preferred hydrophobic vinyl monomer is methyl acrylate.

The following description refers to the use of acetone as the preferred solvent for the vinyl monomer. However, any of the above mentioned organic solvents could be substituted for the acetone ingredient.

A suitable and preferred solvent for the polymerization method is a mixed solvent solution of water and acetone. The water functions as a solvent for the cationic monomer, and the acetone functions as a solvent for the vinyl monomer. The solvent solution preferably contains from about 50% to about 90% by weight acetone, more preferably about 60% to about 85% acetone, and most preferably about 70% to about 75% acetone, with the remainder of the solution being water (i.e. from about 10% to about 50% by weight). In any case, a sufficient amount of acetone must be used to dissolve all of the vinyl monomer and initiator used and a sufficient amount of water must be used to dissolve all of the cationic monomer used in the process.

In the polymerization methods of the present invention, free radical polymerization initiators are used. Selection of a particular initiator may depend on a number of factors including, but not limited to, the polymerization temperature, the solvent, and the monomers used. Suitable polymerization initiators for use in the present invention include, but are not limited to, azo initiators such as 2,2'-azobisisobutyronitrile, 2,2'-azobis(2-methylbutyronitrile), 2,2'-azobis(2,4-dimethylvaleronitrile), and 2,2'-azobis(N,N'-dimethyleneisobutylamidine). Peroxide initiators such as di(n-propyl) peroxydicarbonate, di(sec-butyl) peroxydicarbonate, di(2-ethylhexyl) peroxydicarbonate, t-amyl peroxyneodecanoate, t-butyl peroxyneodecanoate, t-amyl peroxypivalate, and t-butyl peroxypivalate may also be used. The amount of polymerization initiator may desirably range from about 0.01 to 5 weight percent based on the total weight of monomer present.

The polymerization temperature may vary depending on the polymerization solvent, monomers, and initiator used, but in general, range from about 20° C. to about 90° C. Polymerization time generally ranges from about 2 to about 8 hours.

After polymerization is complete, substantially all of the acetone (or other organic solvent) from the reaction mixture is removed therefrom so that the acetone (or other organic solvent) may be re-used or recycled. Recycling acetone (or other organic solvent) is a feature which results in the process being relatively economical and feasible for commercial purposes. Acetone (or other organic solvent) may be removed from the reaction mixture by distillation in either a batch or continuous process, although a continuous process is preferred. However, any other method known in the art may also be used, e.g. an extrusion process and/or a thin film evaporator process. Once removed from the reaction mixture, the acetone (or other organic solvent) is collected and recycled for use as the organic solvent ingredient of the initial solvent and water mixed solvent solution. It may also be necessary to add an amount of make-up acetone (or other organic solvent) when preparing the acetone/water mixed solvent solution using the recycled acetone (or other organic solvent) since generally it is difficult to recover 100% of the acetone (or other organic solvent) from the reaction mixture.

As noted above, most of the organic solvent used in the polymerization process is preferably continuously removed by distillation. The distillation units used for this purpose are preferably evaporators comprising flooded evaporator surfaces, for example circulation-type evaporators with an external heating register, Rober evaporators, Herbert evaporators, long-tube evaporators, falling film evaporators, rising film evaporators, plate evaporators and centrifugal flow thin film evaporators.

Distillation is generally carried out at a temperature of about 20° to 100° C., preferably about 30° to 90° C. under pressure of about 5 to 1100 mbar, and preferably about 300 to 1000 mbar.

To obtain a low residual solvent content, it may be necessary to carry out the distillation in more than one stage. Circulation-type evaporators are preferably used in the subsequent distillation stages as well, although other evaporators such as flow evaporators or boiler evaporators, may also be used here in accordance with the invention.

It has been discovered that the use of acetone as the solvent for the vinyl monomer is preferred in the process of the present invention. As noted above, acetone may be recycled thus reducing the amount of raw material needed in the process. Other water miscible lower alcohols and/or lower ketones are relatively more difficult to remove from the reaction mixture, and are not easy to obtain in high concentrations in the presence of water, which is critical for recycling of the solvent. Additionally, acetone is not listed as a volatile organic compound (VOC) and/or a hazardous air pollutant (HAP). Thus, there is no restrictive special handling required which might substantially increase the cost of the process. Finally, it has been discovered that acetone, but not other lower alcohols and/or lower ketones, used in the present polymerization process advantageously results in an end product cationic polymer having relatively high molecular weight. High molecular weight provides the high strength which is needed to use the polymer as a fibrous web binder. Preferably, the molecular weight of the cationic polymer, as measured by its inherent viscosity (a technique well known in the art), is equal to or greater than 1.0 and more preferably equal to or greater than 1.6.

EXAMPLES

Example 1

Preparation and Evaluation of an Ion Sensitive Cationic Polymer;

Preparation

Acetone (a product of VWR of Westchester, Pa., 444.14 grams) and deionized water (148.05 grams) were charged to a 3-liter round bottom flask equipped with a reflux condenser, stirring means, and a thermocouple. This mixture was cooled in an ice water bath and bubbled with nitrogen for 20 minutes to remove oxygen. After the 20 minutes, the reaction mixture was maintained under a positive pressure of nitrogen and the temperature was raised to the boiling point of the mixture (about 60° C.) using a heating mantle as the heat source.

A first monomer mixture was prepared by mixing 9.15 grams of deionized water and 39.32 grams of Adamquat MC-80 (an 80% aqueous solution of [(2-acryloxy)ethyl]trimethylammonium chloride, a product of Atofina, Philadelphia, Pa.). A second monomer mixture was prepared by mixing 335.26 grams of methyl acrylate (Sigma-Aldrich, St. Louis, Mo.), 51.08 grams acetone, and 2.23 grams VAZO 52 (a free radical initiator available from DuPont of Wilmington, Del.). These two monomer mixtures were added simultaneously over the course of 4 hours to the flask containing the refluxing acetone/water mixture. At the end of the monomer addition, 5.19 grams of deionized water and 15.57 grams of acetone were added to the reaction mixture. The reaction mixture was heated for an additional 4 hours after the end of the monomer addition. On cooling the product of the reaction is a clear polymer solution of about 35% solids with a viscosity of 1220 cps (Brookfield viscometer, room temperature, RVT spindle #2, 20 speed). Monomer conversion was determined to be 96% based on analysis by gas chromatography.

To remove the acetone, the flask was fitted with distillation condenser and a collection flask. Deionized water (1220 grams) was added to the polymer solution and the temperature was raised. A light flow of nitrogen was maintained over the mixture to assist the removal of the distillate. Distillate (608 grams) was recovered over about 4 hours as the temperature of the product rose from room temperature to about 99° C. The distillate composition was found to contain 73.0% acetone and 1.5% methyl acrylate by gas chromatography. Since no other materials were identified by gas chromatography, the remaining 25.5% is thought to be water.

At the end of the distillation, the remaining aqueous mixture was cooled and a mixture of 4.8 grams of 50% hydrogen peroxide (Sigma-Aldrich of St. Louis, Mo.) and 8.0 grams of deionized water was added. The aqueous polymer mixture was slightly hazy. The pH of this material was 3.9, the viscosity was 40 centipoise, and the percent solids was 21.7. The polymer contains less than 0.5% by weight residual acetone. The inherent viscosity of the polymer, a measure of molecular weight, was 1.54.

Product Evaluation:

Thermally-Bonded Air-Laid Nonwoven

A weak, thermally-bonded air-laid (TBAL) nonwoven test substrate was fabricated from Weyerhauser NF405 wood pulp and KoSA T-255 binder fibers. The binder fiber had a polyester core and a polyethylene sheath that melts at approximately 130° C. The air-laid web was formed using approximately 4% binder fiber and thermally bonded above the melting temperature of the sheath. The TBAL basesheet had an average basis weight of 51 gsm and an average caliper of 1.0 mm. The TBAL substrate had a residual cross-direction (CD) wet tensile strength of approximately 30 g/in. in water.

A uniform and consistent amount of each binder was applied to the substrate via a pressurized spray unit. This handsheet spray unit is designed to closely resemble the operation of a commercial airlaid machine using liquid or emulsion binders, but on a much smaller scale. The equipment is housed in a small-framed housing, which can be placed, under a laboratory hood. The unit has a stationary sample holder (10"×13") in the center of the unit and a moveable spray header directly over the sample holder. A vacuum box is installed under the sample holder section to help draw the binder into the web during the application process. The hand-sheet is placed on the vacuum box and the spray head is moved across the substrate as the binder is sprayed in a flat V-shaped pattern. The binder is housed in a pressurized storage vessel located outside of the spray cabinet and is delivered to the spray nozzles via high pressure flexible tubing. The spray header with its spray nozzle (Spraying Systems Company) assembly is moved over the sample by means of a belt driven slide assembly, providing the desired application uniformity and speed. The spray header could be operated at speeds close to 180 fpm and the spray atomization pressure could be set as high as 200 psig. The sample was manually removed and dried in a Werner Mathis, Model LTV Through-Air Dryer (TAD) at the indicated temperatures and for the indicated times. Final basis weight of the samples with binder was approximately 63-64 gsm.

Tensile Testing

A SinTech 1/D tensile tester with Testworks 3.03 version software was used for all sample testing. A 100 Newton load cell with pneumatic grips was utilized. A gauge length of 2 in. and a crosshead speed of 12 in./min. were employed. The peak load values (in g/in.) of sample replicates were recorded and averaged and reported as machine-direction wet tensile strength (MDWT) or cross-direction wet tensile strength (CDWT), depending on how the measurement was made.

The in-use strength of each sample was simulated by either 1) soaking the tensile sample in a salt solution of desired salt type and concentration or a formulated wetting solution containing salt, or 2) applying one of the aforementioned solutions at a fixed add-on (typically 200%-300%). The samples were allowed to equilibrate for several hours before measuring the tensile strength. Disposal strength or dispersibility was assessed by transferring samples treated as "in-use" into an excess (typically 800 mL) of deionized water or hard water of specified hardness level (as metal ion) and allowing them to soak for the indicated amount of time before the tensile strength was measured.

Results

| Example | Uncorrected CDWT (g/in) on TBAL, 25% Binder drying oven conditions: 180° C., 23 seconds | |
|---|---|---|
| | 4% NaCl (soaked overnight) | 4% NaCl (soaked overnight) ↓ Deionized Water (1 hour soak) |
| 1 | 343 ± 27 | 50 ± 5 |

Examples 2-5

Preparation and Evaluation of Ion Sensitive Cationic Polymers Using Recycled Distillate Preparation:

The polymer composition of Example 1 was prepared in a manner substantially similar to the procedure of Example 1. Since the distillate contained methyl acrylate, some Adamquat and VAZO 52 were added at the start of the polymerization to normalize the monomer composition in the flask. Likewise, some correction was made for slight differences in the acetone/water ratio in the distillate. The following is a tabulation of these changes and the resulting products of the reaction. The acetone distillate from Example 1 was used in the polymerization process of Example 2 while the acetone distilled from Example 2 was used in the polymerization process of Example 3. Likewise, the acetone distilled from Example 3 was used in the polymerization process of Example 4 and the acetone distilled from Example 4 was used in the polymerization process of Example 5.

| Parameter | Example 2 | Example 3 | Example 4 | Example 5 |
|---|---|---|---|---|
| Grams of distillate from previous batch in flask | 601.2 | 598 | 602.4 | 525.0 |
| Grams of Adamquat in flask | 1.05 | 1.19 | 1.20 | 0.99 |
| Grams of VAZO 52 in flask | 0.06 | 0.07 | 0.07 | 0.06 |
| Grams of fresh acetone in flask | 1.37 | 1.6 | 1.56 | 76.9 |
| Grams of fresh water in flask | 0.24 | 3.0 | 0.28 | 0.23 |
| Monomer feed 1 Adamquat | 38.27 | 38.13 | 38.12 | 38.33 |
| Monomer mix 1 deionized water | 8.92 | 6.16 | 8.88 | 8.93 |
| Monomer mix 2 methyl acrylate | 326.26 | 325.1 | 325.02 | 326.86 |
| Monomer mix 2 acetone | 49.71 | 49.48 | 49.52 | 49.81 |
| Monomer mix 2 VAZO 52 | 2.17 | 2.16 | 2.16 | 2.17 |
| Grams distillate collected | 598.7 | 627.52 | 617.9 | 639.5 |
| Distillate composition % acetone | 74.0 | 74.0 | 70.2 | 72.5 |
| Distillate composition % methyl acrylate | 1.7 | 1.7 | 1.6 | 1.7 |
| Aqueous product pH | 4.0 | 4.0 | 4.1 | 4.1 |
| Aqueous product viscosity | 35 | 75 | 35 | 55 |
| Aqueous product percent solids | 21.3 | 22.3 | 21.4 | 22.3 |
| Polymer inherent viscosity | 1.54 | 1.50 | 1.52 | 1.52 |

These examples demonstrate the ability to collect the solvent distillate in amounts and compositions similar to the amount and composition of the contents of the flask in Example 1.

Product Evaluation:

The product evaluation was conducted in the same manner outlined in Examples 1.

| Example | uncorrected CDWT (g/in) on TBAL, 25% Binder oven conditions: 180° C., 23 seconds | |
|---|---|---|
| | 4% NaCl (soaked overnight) | 4% NaCl (soaked overnight) ↓ Deionized Water (1 hour soak) |
| 1 | 343 ± 27 | 50 ± 5 |
| 2 | 316 ± 36 | 60 ± 19 |

-continued uncorrected CDWT (g/in) on TBAL, 25% Binder
oven conditions: 180° C., 23 seconds

| Example | 4% NaCl (soaked overnight) | 4% NaCl (soaked overnight) ↓ Deionized Water (1 hour soak) |
|---|---|---|
| 3 | 349 ± 40 | 68 ± 15 |
| 4 | 333 ± 20 | 67 ± 10 |
| 5 | 323 ± 25 | 55 ± 9 |

Conclusion:

Recycling of the acetone up to 5 times had no effect on the molecular weight of the polymer or on the performance of the polymer as a binder.

Examples 6-8

Another Preparation and Evaluation of Other Ion Sensitive Cationic Polymers Varying the Initiator Level Example 6

Polymer Preparation

Acetone (426.94 grams) and deionized water (133.84 grams) were placed in a 3-liter flask following the procedure outlined in Example 1. The first monomer mixture was composed of 42.42 grams of Adamquat MC-80 and 45 grams of deionized water. The second monomer mixture was composed of 286.56 grams of methyl acrylate, 135 grams of acetone and 1.92 grams of VAZO52. The half life of the initiator is about 180 minutes at the reaction temperature. The monomer was added as indicated in Example 1. After the monomer addition, the reaction product was heated for an additional two hours before cooling. The reaction product is a clear 30% polymer containing solution with a viscosity of about 300 centipoise. Monomer conversion was 93.5%. The reaction solution was transformed to an aqueous polymer mixture by adding 800 grams of water and distilling off the acetone over about 6.5 hours. The aqueous final product had a pH of 4.0, a viscosity of 210 centipoise, and a percent solids of 25.5%. The final dry polymer product had an inherent viscosity of 1.49.

Example 7

Polymer Preparation

The product was prepared in the same manner as Example 6, except the initiator level was lowered to 1.28 grams. The aqueous final product had a pH of 3.9, a viscosity of 87 centipoise, and a percent solids of 24.5%. The final dry polymer product had an inherent viscosity of 2.01.

Example 8

Polymer Preparation

The product was prepared in the same manner as Example 6, except the initiator level was lowered to 0.64 grams. The aqueous final product had a pH of 3.8, a viscosity of 50 centipoise, and a percent solids of 25.5%. The final dry polymer product had an inherent viscosity of 3.08.

Product Evaluation:

The product evaluation was conducted in the same manner outlined in Example 1.

| Example | CDWT in 4% NaCl (soaked overnight) (g/in) | CDWT after 1 hour soak in Deionized Water solution (g/in) |
|---|---|---|
| 6 | 278 ± 25 | 47 ± 1 |
| 7 | 298 ± 23 | 103 ± 29 |
| 8 | 409 ± 15 | 245 ± 30 (1 h) |
|   |           | 68 ± 3 (24 h) |

Conclusion:

High molecular weight can be achieved with varying degrees of initiator. In addition, as the initiator is reduced CDWT increases and the dispersibility in water decreases.

Comparative Examples 1 and 2

Preparation and Evaluation of Ion Sensitive Polymers in Methanol and Ethanol

Comparative Example 1

Polymer Preparation

Methanol (323.3 grams from VWR of Westchester, Pa.) was placed in a 3-liter flask and deoxygenated using the procedure of Example 1. A monomer mixture of 286.56 grams of methyl acrylate, 42.42 grams of Adamquat MC-80, 150 grams of methanol, and 0.64 grams of VAZO 52 was prepared. The monomer mixture was added to the methanol solvent over the period of 4 hours. The temperature was held at 60° C. throughout the monomer addition and the subsequent 2 hour reaction hold. The final product is a clear 40% polymer solution. The monomer conversion was 92%. The reaction solution was transformed to an aqueous polymer mixture by adding 800 grams of water and distilling off the methanol. The distillation required about 12 hours and an additional 300 grams of water to completely remove the methanol. The distillate contained a mixture of water and methanol. The aqueous final product had a pH of 4.0, a viscosity of about 250 centipoise, and a percent solids of 25.6% and a residual methanol level of 0.3% by weight. The final dry polymer product had an inherent viscosity of 1.68.

This example illustrates the propensity of methanol to limit the polymer molecular weight. The methanol reaction needs ⅓ the amount of initiator to reach the same molecular weight as the acetone/water mixture in Example 6. When the same amount of initiator was used in acetone/$H_2O$ (Example 8), the molecular weight was significantly higher, as determined by inherent viscosity. The lower initiator levels when using methanol limit the ability to achieve even higher molecular weights. Decreasing the already low initiator level in the methanol system to increase molecular weight would lead to lower monomer conversion which decreases polymer yield. More importantly, it is to be noted that the distillation of methanol required a significantly longer time than when using acetone as the solvent. Additionally, methanol is considered a VOC and HAP material under US EPA regulations.

Comparative Example 2

Polymer Preparation

An ion sensitive polymer was prepared in ethanol by replacing the methanol in comparative example 1 with ethanol. All other conditions were held constant. About 950 grams of water was added to the polymer solution and distilled. The distillate contained a mixture of water and ethanol. The aqueous final product had a pH of 4.0, a viscosity of about 120 centipoise, and a percent solids of 25.7%. The final dry polymer product had an inherent viscosity of 0.42.

This example illustrates the propensity of ethanol to limit the polymer molecular weight. The ethanol reaction resulted in an unacceptably low molecular weight even when using ⅓ the amount of initiator as compared to the acetone/water mixture in Example 6. The lower initiator levels limit the ability to achieve the higher molecular weights needed for product performance. Additionally, ethanol is considered a VOC under US EPA regulations.

Product Evaluation:

The product evaluation was conducted in the same manner outlined in Example 1.

| | uncorrected CDWT (g/in) on TBAL, 25% Binder drying oven conditions: 180° C., 23 seconds | |
|---|---|---|
| Comparative Example | 4% NaCl (soaked overnight) | 4% NaCl (soaked overnight) ↓ Deionized Water (1 hour soak) |
| 1 | 325 ± 26 | 9 ± 15 |
| 2 | 36 ± 1 | 4 ± 3 |

Example 9

Use of a plate evaporator to reduce the acetone fraction of a water-dispersed, cationic resin from approximately 16% weight percent to 0.5% weight percent. The solution polymer of example 1 was diluted with water to give a mixture that contains approximately 17.8% polymer, 65.7% water, 16.0% acetone and 0.5% residual monomer. The present example will demonstrate the removal of solvent using a plate evaporator in a continuous process. The plate configuration has been selected to minimize or eliminate foaming, and to reduce the acetone content of the feed material to the desired level.

A 60 gallon, jacketed, agitated, feed kettle on load cells, a Moyno positive displacement feed pump, canister filter and rotometer will be utilized to feed the steam-heated plate evaporator (304 stainless steel plates). After passing through the plate evaporator, the stripped resin and vapor enter a 14" diameter, elbow inlet, vapor-liquid separator (equipped with Koch contactors). De-entrained vapor from the separator is condensed using a horizontally-inclined shell and tube condenser, condensing in the tubes. A centrifugal pump discharges distillate from the condenser to a collection drum, mounted on a platform scale. Vacuum is maintained by a two-stage steam ejector.

The stripped product is discharged from the bottom of the separator using a Moyno positive displacement pump. Piping is arranged such that the stripped product can be returned to either a product collection tank or to the original feed tank. The plate evaporator is instrumented with thermocouples, rotometer, manometer, load cells and manual scale to collect temperature, flow, pressure and weight data. Polymer solids content of the stripped product is determined by weight loss from a one gram liquid sample heated for 60 minutes at 120° C. An approximate measurement of the acetone content in the distillate is made via specific gravity.

Pertinent data taken during the course of tests 18858, 18859 and 18860 is shown in Tables 9A, 9B and 9C respectively.

Two Stage Continuous Processing (Tests 18858 and 18859)

225 lbs of as-received feed material was diluted with 87.3 lbs of distilled water to produce the feed for the 1st Stage stripping (test 18858). This feed was continuously fed to the plate evaporator at a rate of 126-176 lbs/hr. A steam pressure of 10 psig was utilized, with an operating pressure in the separator of approximately 455 mm Hg absolute, to produce a bottoms temperature of 178° F. After an elapsed time of 110 minutes, the feed rate was increased to explore the affects of higher flow rates. After 180 minutes of processing, 33% evaporation of the feed was obtained.

236.2 lbs of stripped product were collected from the first stage and diluted with 30 lbs of distilled water to make up the feed for the second stage processing (test 18859). 9 psig steam and an operating pressure of 458 mm Hg absolute were utilized in this second pass through the plate evaporator. Distillate and stripped product samples were collected at one-hour intervals. After 140 minutes of processing time, 17.6% evaporation of the feed was obtained.

Batch Recycle Processing (Test 18860)

The plate evaporator was configured to operate in a batch mode, with continuous recycle of stripped product to the feed tank. Approximately 225 lbs of as-received feed material was diluted with 45 lbs of distilled water to make up the starting feed material. Using 9.5 psig steam, an operating pressure of 480-494 mm Hg absolute and a feed/recycle rate of 510 lbs/hr, the batch was stripped in approximately 240 minutes. No evidence of foaming or fouling was noted. Slight discoloration of the stripped product was observed near the end of the test. A total of 265.4 lbs of feed material was reduced to a final weight of 155.8 lbs. The specific gravity of the distillate (overheads) increased from 0.884 after 20 minutes of testing to 0.998 after 220 minutes. Upon reaching the 0.998 specific gravity, it was concluded that the acetone had been removed to the desired level and the test was stopped.

The plate evaporator was effective in reducing the acetone content of the resin intermediate to desired levels with no evidence of foaming or fouling of the heat transfer surfaces. The plate stripping process was successfully demonstrated as both a two-stage continuous process and as a batch process.

TABLE 9A

Product Analysis of Test 18858 (First Pass)

| Time | Sample | % Acetone | % MA | % MeOH | % Solids |
|---|---|---|---|---|---|
| 0 | 18858-2F | 12.3 | 0.28 | 0 | 13.6 |
| 60 | 18858-3P | 1.26 | 0.014 | 0 | 19.9 |
| 120 | 18858-5P | 1.3 | 0.014 | 0 | 19.7 |
| 170 | 18858-7P | 1.34 | 0.015 | 0 | 19.4 |
| Before dilution | 18858-1 | 17.3 | 0.38 | 0 | 19.3 |
| Final | 18858-9C | 1.5 | 0.019 | 0 | 19.3 |

TABLE 9B

Product Analysis of Test 18859 (Second Pass)

| Time | Sample | % Acetone | % MA | % MeOH | % Solids |
|---|---|---|---|---|---|
| 0 | 18859-10 | 1.31 | 0.017 | 0 | 17.1 |
| 60 | 18859-11P | 0.26 | 0.003 | 0 | 20.7 |
| 120 | 18859-13P | 0.14 | 0 | 0 | 20.9 |

TABLE 9C

Product Analysis of Test 18860 (Batch)

| Time | Sample | % Acetone | % MA | % MeOH | DistillateSG | % Solids |
|---|---|---|---|---|---|---|
| 0 | 18860-16F | 13.9 | 0.29 | 0 | 0.884 | 16.0 |
| 40 | 18860-17F | 2.6 | 0.026 | 0 | 0.936 | 18.3 |
| 70 | 18860-19F | 1.7 | 0.015 | 0 | 0.97 | 19.1 |
| 120 | 18860-21F | 0.53 | 0.003 | 0 | 0.984 | 20.6 |
| 180 | 18860-23F | 0.09 | 0 | 0 | 0.993 | 22.6 |
| 240 | 18860-25F | 0.02 | 0 | 0 | 0.998 | 24.9 |
| Before dilution | 18860-15F | 17.3 | 0.38 | 0 | | 19.2 |
| Final | 18860-25F | 0.02 | 0 | 0 | | 24.9 |

We claim:

1. A method of solution polymerizing an ion-triggerable cationic polymer comprising the steps of:
   A. preparing a mixed solvent solution of water and an organic solvent with a boiling point below 100° C.;
   B. heating the solvent solution;
   C. mixing with said solvent solution
      1) one or more vinyl-functional cationic monomers,
      2) one or more hydrophobic vinyl monomers having alkyl side chains of 1 to 4 carbon atoms,
      3) optionally about 0% to 30 mole % of one or more other vinyl monomers with linear or branched alkyl groups longer than 4 carbons, alkyl hydroxy, polyoxyalkylene, or other functional group, and
      4) a free radical initiator, to form a reaction mixture;
   D. heating the reaction mixture for a sufficient amount of time to polymerize the monomers and provide the ion-triggerable cationic polymer;
   E. after polymerization, performing the following steps in any sequence, including simultaneously,
      1) adding water to said reaction mixture to provide an aqueous dispersion of said ion-triggerable cationic polymer, and
      2) removing substantially all of the organic solvent from said reaction mixture using a continuous process.

2. The method of claim 1 further including the step of removing oxygen from said solvent solution prior to forming said reaction mixture.

3. The method of claim 1 wherein the solvent solution is comprised of about 50% to about 90% by weight organic solvent and about 10% to about 50% by weight water.

4. The method of claim 1 wherein the solvent solution is comprised of 75% by weight organic solvent and 25% by weight water.

5. The method of claim 1 wherein the step of heating the solvent solution comprises heating the solvent solution to reflux prior to adding the vinyl-functional cationic monomer, the hydrophobic vinyl monomer, and the free radical initiator thereto to form said reaction mixture.

6. The method of claim 1 wherein said one or more vinyl-functional cationic monomers is added as an aqueous solution to said solvent solution.

7. The method of claim 1 wherein the vinyl-functional cationic monomer is selected from [2-(acryloxy)ethyl] dimethyl ammonium chloride, [2-(methacryloxy)ethyl] dimethyl ammonium chloride, [2-(acryloxy)ethyl] trimethyl ammonium chloride, [2-(methyacryloxy)ethyl] trimethyl ammonium chloride, (3-acrylamidopropyl) trimethyl ammonium chloride, N,N-diallyldimethyl ammonium chloride, [2-(acryloxy)ethyl] dimethylbenzyl ammonium chloride, and [2-(methacryloxy)ethyl] dimethylbenzyl ammonium chloride.

8. The method of claim 1 wherein the vinyl-functional cationic monomer is selected from precursor monomers selected from vinylpyridine, dimethylaminoethyl acrylate and dimethylaminoethyl methacrylate followed by quaternization of the polymer.

9. The method of claim 1 wherein the vinyl-functional cationic monomer is selected from [2-(acryloxy)ethyl] dimethyl ammonium chloride, [2-(acryloxy)ethyl] dimethyl ammonium bromide, [2-(acryloxy)ethyl] dimethyl ammonium iodide, and [2-(acryloxy)ethyl] dimethyl ammonium methyl sulfate.

10. The method of claim 1 wherein the vinyl-functional cationic monomer is selected from [2-(methacryloxy)ethyl) dimethyl ammonium chloride, [2-(methacryloxy)ethyl) dimethyl ammonium bromide, [2-(methacryloxy)ethyl) dimethyl ammonium iodide, and [2-(methacryloxy)ethyl) dimethyl ammonium methyl sulfate.

11. The method of claim 1 wherein the vinyl-functional cationic monomer is selected from [2-(acryloxy)ethyl] trimethyl ammonium chloride, [2-(acryloxy)ethyl] trimethyl ammonium bromide, [2-(acryloxy)ethyl] trimethyl ammonium iodide, and [2-(acryloxy)ethyl] trimethyl ammonium methyl sulfate.

12. The method of claim 1 wherein the vinyl-functional cationic monomer is selected from [2-(methacryloxy)ethyl] trimethyl ammonium chloride, [2-(methacryloxy)ethyl] trimethyl ammonium bromide, [2-(methacryloxy)ethyl] trimethyl ammonium iodide, and [2-(methacryloxy)ethyl] trimethyl ammonium methyl sulfate.

13. The method of claim 1 wherein the vinyl-functional cationic monomer is selected from (3-acrylamidopropyl) trimethyl ammonium chloride, (3-acrylamidopropyl) trimethyl ammonium bromide, (3-acrylamidopropyl) trimethyl ammonium iodide, and (3-acrylamidopropyl) trimethyl ammonium methyl sulfate.

14. The method of claim 1 wherein the vinyl-functional cationic monomer is selected from N,N-diallyldimethyl ammonium chloride, N,N-diallyldimethyl ammonium bromide, N,N-diallyldimethyl ammonium iodide, and N,N-diallyldimethyl ammonium methyl sulfate.

15. The method of claim 1 wherein the vinyl-functional cationic monomer is selected from [2-(acryloxy)ethyl] dimethylbenzyl ammonium chloride, [2-(acryloxy)ethyl] dimethylbenzyl ammonium bromide, [2-(acryloxy)ethyl] dimethylbenzyl ammonium iodide, and [2-(acryloxy)ethyl] dimethylbenzyl ammonium methyl sulfate.

16. The method of claim 1 wherein the vinyl-functional cationic monomer is selected from [2-(methacryloxy)ethyl] dimethylbenzyl ammonium chloride, [2-(methacryloxy)ethyl] dimethylbenzyl ammonium bromide, [2-(methacryloxy)ethyl]dimethylbenzyl ammonium iodide, and [2-(methacryloxy)ethyl] dimethylbenzyl ammonium methyl sulfate.

17. The method of claim 1 wherein the hydrophobic vinyl monomer is selected from branched or linear alkyl vinyl ethers, vinyl esters, acrylamides, and acrylates.

18. The method of claim 1 wherein the hydrophobic vinyl monomer is methyl acrylate.

19. The method of claim 1 wherein the vinyl-functional cationic polymer is [2-(acryloxy)ethyl] trimethyl ammonium chloride.

20. The method of claim 1 wherein the hydrophobic vinyl monomer is selected from the group consisting of methyl acrylate, ethyl acrylate, propyl acrylate and butyl acrylate.

21. The method of claim 1 wherein the free radical initiator is an azo initiator selected from the group consisting of 2,2'-azobisisobutyronitrile, 2,2'-azobis(2-methylbutyronitrile), 2,2'-azobis(2,4-dimethylvaleronitrile), and 2,2'-azobis(N,N'-dimethyleneisobutylamidine).

22. The method of claim 1 wherein the free radical initiator is a peroxide initiator selected from the group consisting of di(n-propyl)peroxydicarbonate, di(sec-butyl)peroxydicarbonate, di(2-ethylhexyl)peroxydicarbonate, t-amyl peroxyneodecanoate, t-butyl peroxyneodecanoate, t-amyl peroxypivalate, and t-butyl peroxypivalate.

23. The method of claim 1 further including preparing the mixed solvent solution of step A using the organic solvent removed after polymerization from step E, and thereafter repeating steps B through E.

24. The method of claim 23 further including adding an amount of make-up organic solvent to the organic solvent from step E when preparing the mixed solvent solution.

25. The method of claim 1 wherein said organic solvent is selected from the group consisting of acetone, methylethylketone, tetrahydrofuran, methylacetate, acetonitrile, methanol, ethanol, isopropanol, 1-propanol, t-butanol and mixtures thereof.

26. The method of claim 1 wherein said organic solvent is acetone.

27. The method of claim 1 wherein said continuous process comprises passing said reaction mixture through a plate evaporator.

* * * * *

UNITED STATES PATENT AND TRADEMARK OFFICE
CERTIFICATE OF CORRECTION

PATENT NO. : 7,619,033 B2  Page 1 of 1
APPLICATION NO. : 11/229413
DATED : November 17, 2009
INVENTOR(S) : Calhoun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Twenty-sixth Day of October, 2010

David J. Kappos
*Director of the United States Patent and Trademark Office*